(12) United States Patent
Shimomura et al.

(10) Patent No.: US 8,304,951 B2
(45) Date of Patent: Nov. 6, 2012

(54) DYNAMOELECTRIC MACHINE

(75) Inventors: Ryuichi Shimomura, Tokyo (JP); Hiroyuki Akita, Tokyo (JP); Masaya Inoue, Tokyo (JP); Toshiyuki Yoshizawa, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 168 days.

(21) Appl. No.: 12/866,099

(22) PCT Filed: Feb. 13, 2008

(86) PCT No.: PCT/JP2008/052324
§ 371 (c)(1),
(2), (4) Date: Aug. 4, 2010

(87) PCT Pub. No.: WO2009/101674
PCT Pub. Date: Aug. 20, 2009

(65) Prior Publication Data
US 2011/0001383 A1    Jan. 6, 2011

(51) Int. Cl.
     *H02K 1/28*      (2006.01)
     *H02K 21/12*    (2006.01)
     *H02K 1/27*      (2006.01)
     *H02K 19/22*    (2006.01)

(52) U.S. Cl. ............... 310/156.72; 310/156.66

(58) Field of Classification Search ............. 310/156.66–156.73, 263
See application file for complete search history.

(56) References Cited

U.S. PATENT DOCUMENTS

| | | | |
|---|---|---|---|
| 4,959,577 A | 9/1990 | Radomski | |
| 5,543,676 A | 8/1996 | York et al. | |
| 6,144,138 A | 11/2000 | Ragaly | |
| 6,555,944 B1 | 4/2003 | York | |
| 6,747,384 B2 * | 6/2004 | Militello et al. | 310/156.08 |
| 6,853,112 B2 * | 2/2005 | Nakamura et al. | 310/263 |
| 6,897,597 B1 * | 5/2005 | Armiroli et al. | 310/263 |
| 7,064,466 B2 * | 6/2006 | Kusase | 310/156.66 |
| 7,560,851 B2 * | 7/2009 | Inoue et al. | 310/263 |
| 7,642,691 B2 * | 1/2010 | Morita et al. | 310/263 |
| 7,843,107 B2 * | 11/2010 | Inoue et al. | 310/263 |

(Continued)

FOREIGN PATENT DOCUMENTS

JP    10-136623 A    5/1998

(Continued)

OTHER PUBLICATIONS

International Search Report (PCT/ISA/210) dated Apr. 22, 2008.

*Primary Examiner* — Burton Mullins
(74) *Attorney, Agent, or Firm* — Buchanan Ingersoll & Rooney PC (57) ABSTRACT

The present invention provides a dynamoelectric machine that enables permanent magnets to be held stably in trough portions that are formed on portions of a yoke portion that are positioned between adjacent claw-shaped magnetic pole portions.

In a dynamoelectric machine according to the present invention, first and second magnet holders are disposed so as to span first and second trough portions that are formed on portions of first and second yoke portions that are positioned between circumferentially adjacent first and second claw-shaped magnetic pole portions, and first and second permanent magnets are held by the first and second magnet holders so as to face inner circumferential surfaces near tip ends of the claw-shaped magnetic pole portions so as to have a predetermined clearance.

9 Claims, 8 Drawing Sheets

U.S. PATENT DOCUMENTS

| | | | |
|---|---|---|---|
| 8,148,864 B2 * | 4/2012 | Yoshizawa et al. | 310/156.12 |
| 2003/0137212 A1 | 7/2003 | Militello et al. | |
| 2007/0046139 A1 * | 3/2007 | Ishizuka | 310/263 |
| 2007/0262672 A1 * | 11/2007 | Maekawa et al. | 310/263 |
| 2011/0043068 A1 * | 2/2011 | Yoshizawa et al. | 310/181 |

FOREIGN PATENT DOCUMENTS

| | | |
|---|---|---|
| JP | 2002-199678 A | 7/2002 |
| JP | 2003-244875 A | 8/2003 |
| WO | WO 99/08365 A1 | 2/1999 |

* cited by examiner

DYNAMOELECTRIC MACHINE

TECHNICAL FIELD

The present invention relates to a dynamoelectric machine such as an automotive alternator, etc., and particularly relates to a permanent magnet holding construction in a Lundell rotor.

BACKGROUND ART

Automotive alternators that use Lundell rotors have been used in automobiles for decades. Loads from electrical equipment that is mounted due to environmental issues have been increasing rapidly in recent years, and further increases in generated power are being sought from Lundell rotors.

Conventionally, means of disposing permanent magnets between claw-shaped magnetic poles that face each other circumferentially in a Lundell rotor have been adopted in order to solve such problems (see Patent Literature 1, for example).

[Patent Literature 1]
U.S. Pat. No. 4,959,577 (Specification)

DISCLOSURE OF THE INVENTION

Problem to be Solved by the Invention

In a Lundell rotor, a core body that has a shape in which portions that correspond to claw-shaped magnetic pole portions extend radially outward from a yoke portion is formed using a cold forging method, and then claw-shaped magnetic pole portions are formed by bending approximately at right angles the portions that correspond to claw-shaped magnetic pole portions that extend radially outward from the yoke portion. Here, trough portions are disposed on portions that are positioned between the adjacent claw-shaped magnetic pole portions of the yoke portion in order to increase yield in the step of bending the portions that correspond to claw-shaped magnetic pole portions.

In a Lundell rotor, because the claw-shaped magnetic pole portions have a cantilever construction, and the trough portions are disposed on portions that are positioned between the adjacent claw-shaped magnetic pole portions of the yoke portion in this manner, relative displacement arises between the adjacent claw-shaped magnetic pole portions during high-speed rotation. Thus, in conventional permanent magnet holding constructions that hold permanent magnets between adjacent claw-shaped magnetic pole portions, one problem has been that the permanent magnets cannot be held stably.

The present invention aims to solve the above problems and an object of the present invention is to provide a dynamoelectric machine that enables permanent magnets to be held stably in trough portions that are formed on portions of a yoke portion that are positioned between adjacent claw-shaped magnetic pole portions.

Means for Solving the Problem

In order to achieve the above object, according to one aspect of the present invention, there is provided a dynamoelectric machine including: a rotor having: a pole core having: a boss portion; a pair of yoke portions that are disposed so as to extend radially outward from two axial end edge portions of the boss portion; and a plurality of claw-shaped magnetic pole portions that are disposed so as to extend in an axial direction alternately from each of the pair of yoke portions, and that are arranged circumferentially so as to intermesh with each other, trough portions being formed on respective portions of the yoke portions between circumferentially adjacent claw-shaped magnetic pole portions, and the pole core being fixed to a rotating shaft that is inserted through a central axial position of the boss portion; and a field coil that is housed inside a space that is surrounded by the boss portion, the pair of yoke portions, and the plurality of claw-shaped magnetic pole portions; and a stator that is disposed so as to surround an outer circumference of the rotor so as to have a predetermined air gap interposed. A magnet holder is disposed so as to span the trough portions, and a permanent magnet is held in the magnet holder so as to face an inner circumferential surface near a tip end of the claw-shaped magnetic pole portions so as to have a predetermined clearance.

Effects of the Invention

According to the present invention, because magnet holders are disposed so as to span over trough portions that are formed on portions of yoke portions between circumferentially adjacent claw-shaped magnetic pole portions, displacement of the claw-shaped magnetic pole portions during the high-speed rotation will not affect the holding mechanism of the magnet holders. Volume of the magnet holders on the claw-shaped magnetic pole portions can be reduced, reducing centrifugal forces that act on the magnet holders. Thus, the magnet holders can be held on the yoke portions stably using a simple holding construction. Permanent magnets that have a minimum required magnet volume can thereby be held on the yoke portions stably using the magnet holders.

BEST MODE FOR CARRYING OUT THE INVENTION

Embodiment 1

Figure 1:
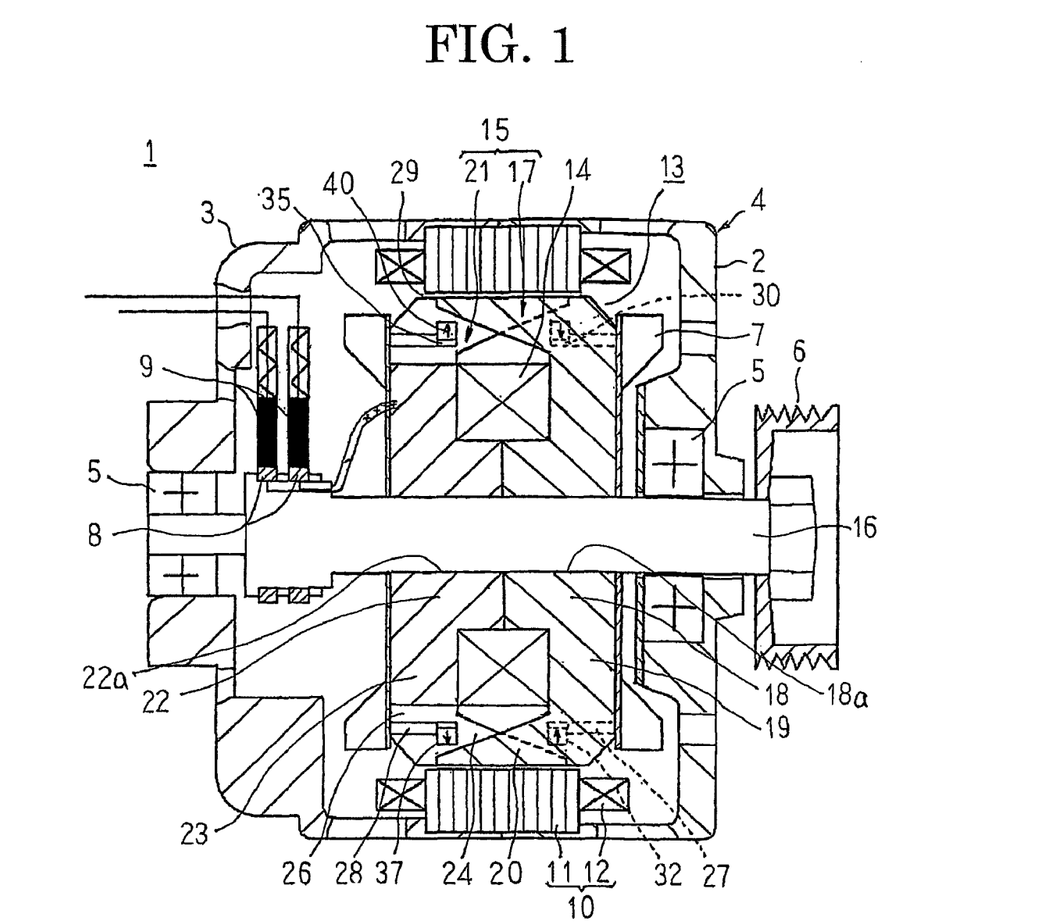
FIG. 1 is a cross section that schematically shows an automotive alternator according to Embodiment 1 of the present invention.
Figure 2:
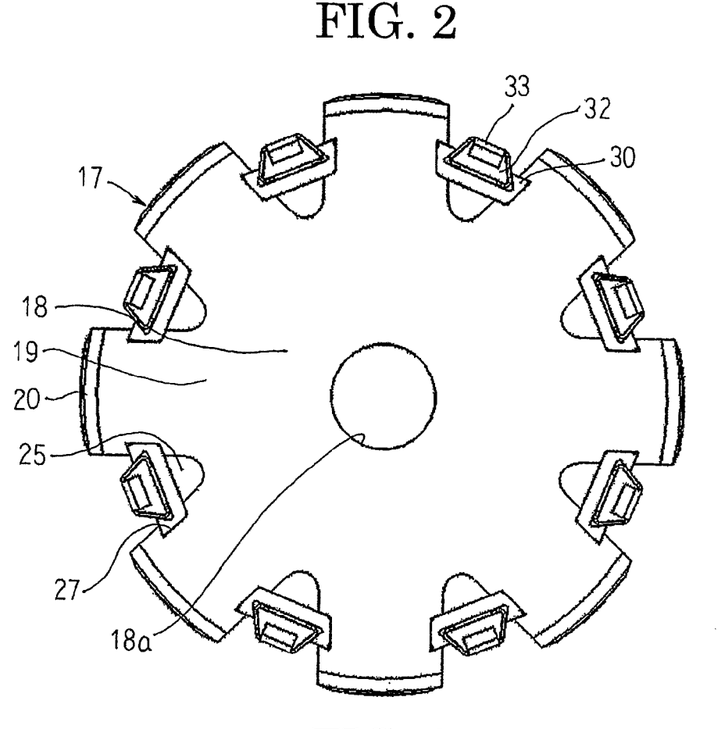
FIG. 2 is an end elevation that shows a rotor that can be used in the automotive alternator according to Embodiment 1 of the present invention.
Figure 3:
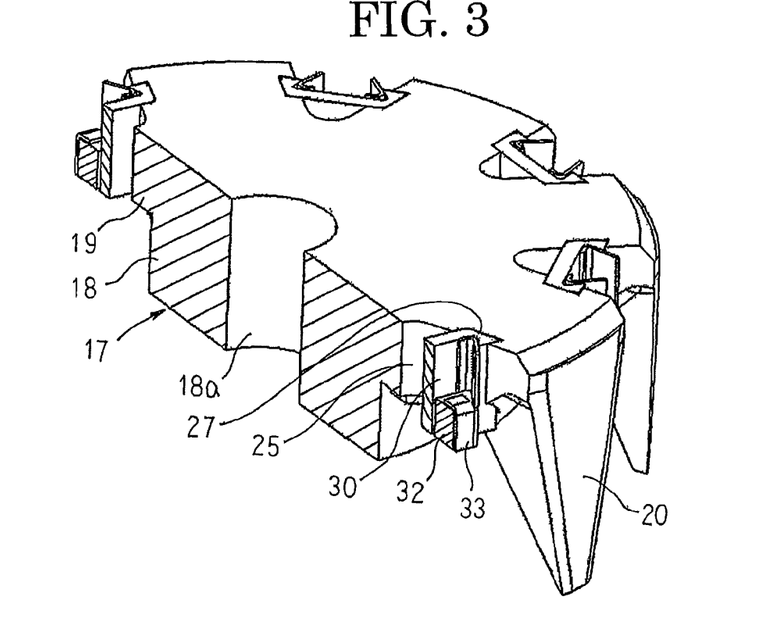
FIG. 3 is a cross section that shows a state in which permanent magnets are mounted to a first pole core body that constitutes the rotor that can be used in the automotive alternator according to Embodiment 1 of the present invention.
Figure 4:
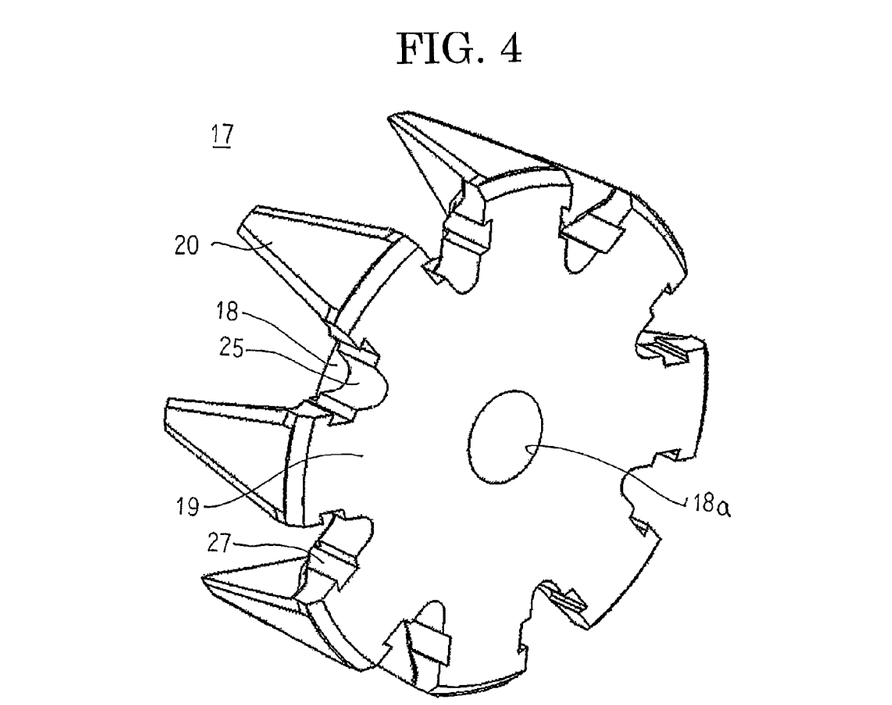
FIG. 4 is a perspective that shows a state in which permanent magnets are not mounted to the first pole core body that constitutes the rotor that can be used in the automotive alternator according to Embodiment 1 of the present invention.
Figure 5:
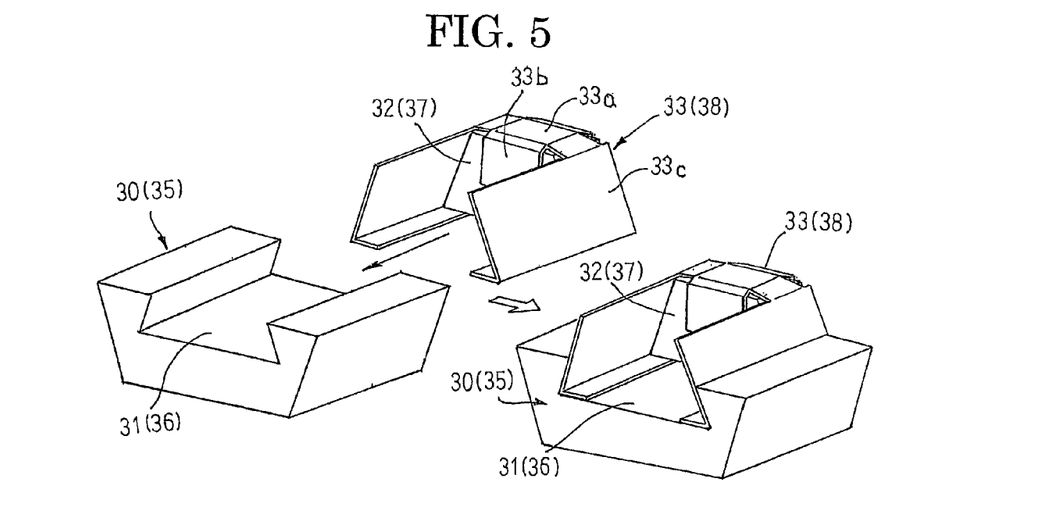
FIG. 5 is a perspective that explains a method for mounting permanent magnets into magnet holders in the automotive alternator according to Embodiment 1 of the present invention.

FIG. 1 is a cross section that schematically shows an automotive alternator according to Embodiment 1 of the present invention, FIG. 2 is an end elevation that shows a rotor that can be used in the automotive alternator according to Embodiment 1 of the present invention, FIG. 3 is a cross section that shows a state in which permanent magnets are mounted to a first pole core body that constitutes the rotor that can be used in the automotive alternator according to Embodiment 1 of the present invention, FIG. 4 is a perspective that shows a state in which permanent magnets are not mounted to the first pole core body that constitutes the rotor that can be used in the automotive alternator according to Embodiment 1 of the present invention, and FIG. 5 is a perspective that explains a method for mounting permanent magnets into magnet holders in the automotive alternator according to Embodiment 1 of the present invention.

In FIGS. 1 through 5, an automotive alternator 1 includes: a case 4 that is constituted by a front bracket 2 and a rear bracket 3 that are each made of aluminum in an approximate cup shape; a rotor 13 that is rotatably disposed inside the case 4 such that a rotating shaft 16 is supported by means of bearings 5 in the case 4; a pulley 6 that is fixed to an end portion of the rotating shaft 16 that projects outward at a front end of the case 4; fans 7 that are fixed to two axial end surfaces of the rotor 13; a stator 10 that is fixed to the case 4 so as to surround an outer circumference of the rotor 13 so as to have a constant air gap 29 relative to the rotor 13; a pair of slip rings 8 that are fixed to a rear end of the rotating shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is mounted to the stator core 11, and in which an alternating current arises due to changes in magnetic flux from a field coil 14 (described below) that accompany rotation of the rotor 13.

The rotor 13 includes: a field coil 14 that generates magnetic flux on passage of an excitation current; a pole core 15 that is disposed so as to cover the field coil 14 and in which magnetic poles are formed by that magnetic flux; and the rotating shaft 16, which is fitted through a central axial position of the pole core 15.

The pole core 15 is configured so as to be divided into first and second pole core bodies 17 and 21 that are each prepared by a cold forging method using a low carbon steel such as S10C, for example.

The first pole core body 17 has: a first boss portion 18 that has an outer circumferential surface that has a cylindrical shape, and in which a rotating shaft insertion aperture 18a is formed so as to pass through a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially. In addition, first trough portions 25 are recessed into U shapes at portions that are positioned between respective adjacent first claw-shaped magnetic pole portions 20 of the first yoke portion 19.

The second pole core body 21 has: a second boss portion 22 that has an outer circumferential surface that has a cylindrical shape, and in which a rotating shaft insertion aperture 22a is formed so as to pass through a central axial position; a thick ring-shaped second yoke portion 23 that is disposed so as to extend radially outward from a second end edge portion of the second boss portion 22; and second claw-shaped magnetic pole portions 24 that are disposed so as to extend toward a first axial end from outer circumferential portions of the second yoke portion 23. Eight, for example, second claw-shaped magnetic pole portions 24 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially. In addition, second trough portions 26 are recessed into U shapes at portions that are positioned between respective adjacent second claw-shaped magnetic pole portions 24 of the second yoke portion 23.

First and second pole core bodies 17 and 21 that are configured in this manner are fixed to the rotating shaft 16 that has been fitted through the rotating shaft insertion apertures 18a and 22a such that the first and second claw-shaped magnetic pole portions 20 and 24 alternately intermesh and a second end surface of the first boss portion 18 is abutted to a first end surface of the second boss portion 22. The field coil 14, which has been wound onto a bobbin (not shown), is mounted in a space that is surrounded by the first and second boss portions 18 and 22, the first and second yoke portions 19 and 23, and the first and second claw-shaped magnetic pole portions 20 and 24. Here, the first and second boss portions 18 and 22 and the first and second yoke portions 19 and 23 correspond to a boss portion and first and second yoke portions of the pole core 15.

A first magnet holder 30 is prepared by a cold forging method or drawing, etc., using a magnetic material such as iron, a ferromagnetic alloy, etc. This first magnet holder 30 is prepared into a columnar body that has a trapezoidal cross section perpendicular to a longitudinal direction in which upper and lower surfaces are mutually parallel flat surfaces, two side surfaces are inclined surfaces that have spacings that become gradually wider toward the upper surface, and two end surfaces are flat surfaces that are perpendicular to the longitudinal direction. A first interfitting groove 31 that has a groove direction in the longitudinal direction of the first magnet holder 30 is recessed so as to have an opening at the upper surface of the first magnet holder 30. This first interfitting groove 31 is formed into a wedge shape in which a bottom surface thereof is a flat surface that is parallel to the upper and lower surfaces of the first magnet holder 30, and a groove width thereof becomes gradually narrower toward the opening.

A first permanent magnet 32 is prepared into a columnar body that has a trapezoidal cross section perpendicular to a thickness direction in which upper and lower surfaces are mutually parallel flat surfaces, two side surfaces are inclined surfaces that have spacings that becomes gradually wider toward the upper surface, and two end surfaces are flat surfaces that are perpendicular to the thickness direction.

A first magnet scattering preventing cover 33 is prepared by bending or cutting, etc., a thin plate of SPCC, stainless steel, etc., and has: a rectangular base portion 33a, two end sides 33b that are bent approximately at right angles from two facing sides of the base portion 33a; and two flanking sides 33c that are bent at a predetermined angle from two remaining facing sides of the base portion 33a, that have leading ends that are folded over, and that have a length equal to that of the groove length of the first interfitting groove 31. The first magnet scattering preventing cover 33 is mounted onto the first permanent magnet 32 such that the upper surface of the first permanent magnets 32 is covered by the base portion 33a, the end sides 33b are placed alongside the two end surfaces of the first permanent magnet 32, the flanking sides 33c are placed alongside two side surfaces of the first permanent magnet 32, and the folded-over portions of the leading ends of the flanking sides 33c are placed against the bottom surface of the first permanent magnet 32, and is fixed by applying an adhesive between the base portion 33a and the upper surface of the first permanent magnet 32.

The first permanent magnet 32 to which the first magnet scattering preventing cover 33 has been mounted is fitted into the first interfitting groove 31, and is held so as to be connected magnetically to the first magnet holders 30, an adhesive being applied if required. Here, the two flanking sides 33c of the first magnet scattering preventing cover 33 are held between the wedge-shaped side surfaces of the first receiving groove 31 and the side surfaces of the first permanent magnet 32, preventing the first permanent magnet 32 from being pulled out.

A second magnet holder 35 is prepared into an identical shape as the first magnet holder 30 using an identical material. A second permanent magnet 37 is prepared into an identical shape as the first permanent magnet 32 using an identical material. A second magnet scattering preventing cover 38 is prepared into an identical shape as the first magnet scattering preventing cover 33 using an identical material. The second magnet scattering preventing cover 38 is mounted to the second permanent magnet 37, and the second permanent magnet 37 is fitted into a second interfitting groove 36 that has been formed in the upper surface of the second magnet holder 35, and is held so as to be connected magnetically to the second magnet holders 35, an adhesive being applied if required.

First holding grooves 27 are recessed so as to pass through from a first end portion to a second end portion of the first yoke portion 19 near root ends of respective first claw-shaped magnetic pole portions 20 of the first pole core body 17 so as to have openings at respective facing portions near upper portions of inner walls surfaces of the respective first trough portions 25 and so as to have groove directions in the axial direction. Similarly, second holding grooves 28 are recessed so as to pass through from a first end portion to a second end portion of the second yoke portion 23 near root ends of respective second claw-shaped magnetic pole portions 24 of the second pole core body 21 so as to have openings at respective facing portions near upper portions of inner walls surfaces of the respective second trough portions 26 and so as to have groove directions in the axial direction. Here, the first and second holding grooves 27 and 28 are formed so as to have groove shapes that have angular U-shaped cross sections that conform to shapes of interfitting portions of the first and second magnet holders 30 and 35. In other words, because the first and second holding grooves 27 and 28 have groove shapes that have angular U-shaped cross sections that are constituted by pairs of parallel, flat side surfaces into which the upper and lower surfaces of the first and second magnet holders 30 and 35 engage, and flat bottom surfaces into which the side surfaces of the first and second magnet holders 30 and 35 engage, the first and second holding grooves 27 and 28 can be prepared by a single broaching on a pole core body that has been cold forged, simplifying the step of groove machining.

The first magnet holders 30 are mounted to the first pole core body 17 by being press-fitted into the facing first holding grooves 27 from axially outside with the first magnet scattering preventing covers 33 oriented upward so as to be magnetically connected when disposed so as to span each of the first trough portions 25, adhesive being applied if required. Here, the base portions 33a of the first magnet scattering preventing covers 33, that is, the upper surfaces of the first permanent magnets 32, face inner circumferential surfaces near the tip ends of the second claw-shaped magnetic pole portions 24 so as to leave a predetermined clearance.

Now, the upper and lower surfaces of the first magnet holders 30 are flat surfaces that are perpendicular to a radial direction of the first pole core body 17, and that are mutually parallel, and the upper surfaces are surfaces that are positioned on a radially outer side of the upper and lower surfaces. The two side surfaces of the first magnet holders 30 are inclined surfaces between which spacing becomes gradually wider toward the upper surface, and longitudinal directions are oriented in an axial direction of the first pole core body 17. The two side surfaces of the first receiving grooves 31 are inclined surfaces in which groove widths become gradually narrower toward the opening. The upper and lower surfaces of the first permanent magnets 32 are flat surfaces that are perpendicular to a radial direction of the first pole core body 17, and that are mutually parallel, and the upper surfaces are surfaces that are positioned on a radially outer side of the upper and lower surfaces. The two side surfaces of the first permanent magnets 32 are inclined surfaces between which spacing becomes gradually narrower toward the upper surface, and thickness directions are oriented in an axial direction of the first pole core body 17.

Similarly, the second magnet holders 35 are mounted to the second pole core body 21 by being press-fitted into the facing second holding grooves 28 from axially outside with the second magnet scattering preventing cover 38 oriented upward so as to be magnetically connected when disposed so as to span each of the second trough portions 26, adhesive being applied if required. Here, the upper surfaces of the second permanent magnets 37 face inner circumferential surfaces near the tip ends of the first claw-shaped magnetic pole portions 20 so as to leave a predetermined clearance.

Now, the upper and lower surfaces of the second magnet holders 35 are flat surfaces that are perpendicular to a radial direction of the second pole core body 21, and that are mutually parallel, and the upper surfaces are surfaces that are positioned on a radially outer side of the upper and lower surfaces. The two side surfaces of the second magnet holders 35 are inclined surfaces between which spacing becomes gradually wider toward the upper surface, and longitudinal directions are oriented in an axial direction of the second pole core body 21. The two side surfaces of the second receiving grooves 36 are inclined surfaces in which groove widths become gradually narrower toward the opening. The upper and lower surfaces of the second permanent magnets 37 are flat surfaces that are perpendicular to a radial direction of the second pole core body 21, and that are mutually parallel, and the upper surfaces are surfaces that are positioned on a radially outer side of the upper and lower surfaces. The two side surfaces of the second permanent magnets 37 are inclined surfaces between which spacing becomes gradually narrower toward the upper surface, and thickness directions are oriented in an axial direction of the second pole core body 17.

In first and second magnet holders 30 and 35 that have been assembled in this manner, radial and circumferential movement of the first and second magnet holders 30 and 35 is prevented by being fitted together with the first and second holding grooves 27 and 28, and axial movement is prevented by the fan 7 and the bobbin onto which the field coil 14 is wound. For the first and second permanent magnets 32 and 37 and the first and second magnet scattering preventing covers 33 and 38, radial and circumferential movement of the first and second permanent magnets 32 and 37 and the first and second magnet scattering preventing covers 33 and 38 is prevented by being fitted together with the first and second interfitting grooves 31 and 36, and axial movement is prevented by the fan 7 and the bobbin onto which the field coil 14 is wound.

Scattering of the permanent magnets will now be explained. Moreover, because scattering is identical for the first and second permanent magnets 32 and 37, only the first permanent magnets 32 will be explained here.

First, cracking or chipping may arise in the first permanent magnets 32 by the second claw-shaped magnetic pole portions 24 oscillating due to centrifugal force, or foreign matter being blown in, and colliding into the first permanent magnets 32. Situations thereby arise in which broken or chipped fragments of magnet may be scattered from the first permanent magnets 32.

Cracking or chipping may also arise in the first permanent magnets 32 if stresses that act on the side surfaces of the first permanent magnets 32 from the side surfaces of the first receiving grooves 31 of the first magnet holders 30 exceed an allowable stress of the first permanent magnets 32. Situations thereby also arise in which broken or chipped fragments of magnet may be scattered from the first permanent magnets 32.

In addition, centrifugal forces act so as to move the first permanent magnets 32 radially outward. This radially outward movement of the first permanent magnets 32 displaces the side portions of the first magnet holders 30 so as to expand upper portion openings of the first receiving groove 31. At this point, bending stresses act on intersecting portions between the bottom surfaces and the side surfaces of the first receiving grooves 31. If these bending stresses exceed a tolerance strength of the first magnet holders 30, the magnets cannot be held, giving rise to situations in which the first permanent magnets 32 may dislodge from the first magnet holders 30.

In Embodiment 1, because the first permanent magnets 32 are fitted into the first magnet holders 30 such that the first magnet scattering preventing covers 33 are mounted thereto, dislodgment of broken or chipped fragments of magnet from the first permanent magnets 32 is prevented.

Because the first magnet holders 30 are fitted onto the first holding grooves 27, displacement of the side portions of the first magnet holders 30 is borne by the first holding grooves 27. Displacement of the side portions of the first magnet holders 30 that would exceed the tolerance strength of the first magnet holders 30 is thereby limited, preventing dislodgment of the first permanent magnets 32 from the first magnet holders 30.

Next, operation of an automotive alternator 1 that has been configured in this manner will be explained.

First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles.

At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

In Embodiment 1, because the first and second magnet holders 30 and 35 are disposed so as to span over the first and second trough portions 25 and 26 in this manner, volume of the first and second magnet holders 30 and 35 can be reduced. Thus, centrifugal forces that act on the first and second magnet holders 30 and 35 are reduced during high-speed rotation, and influence of displacement of the first and second claw-shaped magnetic pole portions 20 and 24 on the holding construction of the first and second magnet holders 30 and 35 that results from centrifugal forces and thermal expansion is also eliminated. First and second permanent magnets 32 and 37 that have a minimum required volume can thereby be held in the pole core 15 stably.

Because the first and second magnet holders 30 and 35 are fitted into first and second holding grooves 27 and 28 that are recessed near upper portions of inner wall surfaces of the first and second trough portions 25 and 26, the first and second magnet holders 30 and 35 can be held in the pole core 15 using a simple holding construction. In addition, because the first and second permanent magnets 32 and 37 are fitted into first and second interfitting grooves 31 and 36 that are recessed into upper surfaces of the first and second magnet holders 30 and 35, the first and second permanent magnets 32 and 37 can be held in the first and second magnet holders 30 and 35 using a simple holding construction.

Because the first and second magnet holders 30 and 35 are prepared as separate parts from the first and second pole core bodies 17 and 21, and the first and second magnet holders 30 and 35 have superior machinability, making it easy to be ensure milling precision, interfitting surfaces of the first and second holding grooves 27 and 28 and interfitting surfaces of the first and second permanent magnets 32 and 37 can be prepared with high precision. Thus, interfitting grooves that have groove shapes that conform to the shapes of the permanent magnets mounted thereto can be prepared easily, enabling permanent magnets that have a desired shape to be held. Thus, because gaps at interfitting portions between the first and second magnet holders 30 and 35 and the first and second yoke portions 19 and 23, and also gaps at interfitting portions between the first and second magnet holders 30 and 35 and the first and second permanent magnets 32 and 37, can be kept to a minimum, reducing magnetic resistance at these interfitting portions, the amount of magnetic flux from the magnets is increased, enabling the magnets to be used effectively.

Because the first and second magnet holders 30 and 35 link upper portions of inner wall surfaces of the first and second trough portions 25 and 26 circumferentially, occurrences of deformation of the pole core 15 can be suppressed.

Because the first and second permanent magnets 32 and 37 are prepared into columnar bodies that have trapezoidal cross sections that have a predetermined thickness, the first and second permanent magnets 32 and 37 can be cut from a magnet base material efficiently using an abrasive wheel, increasing material yield.

Because the upper surfaces, two side surfaces, and two end surfaces of the first and second permanent magnets 32 and 37 are covered by the first and second magnet scattering preventing covers 33 and 38, even if the first and second claw-shaped magnetic pole portions 20 and 24 vibrate in a radial direction and do happen to contact the first and second permanent magnets 32 and 37, the first and second magnet scattering preventing covers 33 and 38 function as a buffer layer, enabling occurrences of damage to the first and second permanent magnets 32 and 37 to be suppressed. The exposed surface area of the first and second permanent magnets 32 and 37 is also reduced, also suppressing damage and scattering of the first and second permanent magnets 32 and 37.

Because the first and second permanent magnets 32 and 37 are disposed so as to face inner circumferential surfaces near tip ends of the first and second claw-shaped magnetic pole portions 20 and 24, the first and second permanent magnets 32 and 37 are positioned radially inside an outermost circumferential surface of the rotor 13. Thus, stator slot harmonics are confined to outermost circumferential portions of the first and second claw-shaped magnetic pole portions 20 and 24, and do not act to heat the first and second permanent magnets 32 and 37 by direct induction. As a result, the first and second permanent magnets 32 and 37 are prevented from being heated and thermally demagnetized.

Because the first and second permanent magnets 32 and 37 are disposed so as to face the inner circumferential surfaces near the tip ends of the first and second claw-shaped magnetic pole portions 20 and 24, the magnetic circuits of the first and second permanent magnets 32 and 37 are closed magnetic circuits inside the rotor, and magnetic flux components that interact with the stator 10 are eliminated. Thus, the occurrence of voltages induced by the first and second permanent magnets 32 and 37 during no-load de-energization is suppressed. As a result, the amount of magnetic flux from the first and second permanent magnets 32 and 37 that can be used effectively can be increased.

Because the flanking sides 33c and 38c of the first and second magnet scattering preventing covers 33 and 38 have lengths equal to the groove lengths of the first and second interfitting grooves 31 and 36, axial movement of the first and second magnet scattering preventing covers 33 and 38 can be restricted by the flanking sides 33c and 38c engaging with the bobbin onto which the field coil 14 is wound and the fan 7.

The material for the magnet holders will now be considered.

It is generally preferable for magnet holders to have a mechanical strength greater than that of permanent magnets. If magnet holders are prepared using stainless steel, for example, which has great mechanical strength, the magnet holders can withstand centrifugal forces that act on the magnet holders themselves and on the permanent magnets that are disposed in the magnet holders, and can hold the permanent magnets stably. If the magnet holders are prepared using a magnetic material such as iron, or a ferromagnetic alloy, etc., magnetic flux that originates from the permanent magnets enters the magnet holders, branches off circumferentially inside the magnet holders and flows into the yoke portion, forming a magnetic circuit that flows through the boss portions, the yoke portion, and the claw-shaped magnetic pole portions, and returns to the permanent magnets and is closed inside the rotor. Thus, from a magnetic point of view, it is preferable for the magnet holders to be prepared using a magnetic material because magnetic saturation due to the magnetic field that originates from the field coil can be alleviated.

Next, the material for the magnet scattering preventing covers will be considered.

If the magnet scattering preventing covers are prepared using a magnetic material, magnetic flux that originates in the magnets enters the magnet holders by means of the magnet scattering preventing covers, forming a magnetic path that returns to the permanent magnets. As a result, it is necessary to increase the magnet volume of the permanent magnets because the amount of magnetic flux entering the facing claw-shaped magnetic pole portions is reduced. From the above, it is desirable for the magnet scattering preventing covers to be prepared using a nonmagnetic material such as a stainless steel or a synthetic resin, for example.

Moreover, in Embodiment 1 above, first and second holding grooves 27 and 28 are recessed so as to have groove directions that are parallel to a central axis and so as to pass through from a first end to a second end of first and second yoke portions 19 and 23, but it is not absolutely necessary for first and second holding grooves to pass through axially, provided that they have an opening at the first end or the second end of the first and second yoke portions 19 and 23. In that case, the direction of insertion of the first and second magnet holders 30 and 35 into the first and second holding grooves 27 and 28 is limited to one axial end, but the closed ends function as stoppers that restrict axial movement of the first and second magnet holders 30 and 35, facilitating axial positioning of the first and second magnet holders 30 and 35.

The groove directions of the first and second holding grooves 27 and 28 need only be approximately parallel to the central axis, and may also be inclined so as to be parallel to the inner circumferential surfaces near the tip ends of the claw-shaped magnetic pole portions, for example.

The first and second permanent magnets 32 and 37 are formed so as to have trapezoidal cross sections that have a predetermined thickness, but the first and second permanent magnets 32 and 37 are not limited to a particular cross-sectional shape provided that they can be fitted together with and held by the interfitting grooves of the first and second magnet holders.

In Embodiment 1 above, the flanking sides 33c and 38c of the first and second magnet scattering preventing covers 33 and 38 have lengths that are equal to the groove lengths of the first and second interfitting grooves 31 and 36, but it is not absolutely necessary for the lengths of the flanking sides of the first and second magnet scattering preventing covers to be made equal to the groove lengths of the first and second interfitting grooves provided that axial movement of the first and second magnet scattering preventing covers is restricted by adhesion or by being fitted into the first and second interfitting grooves, etc.

Embodiment 2

Figure 6:
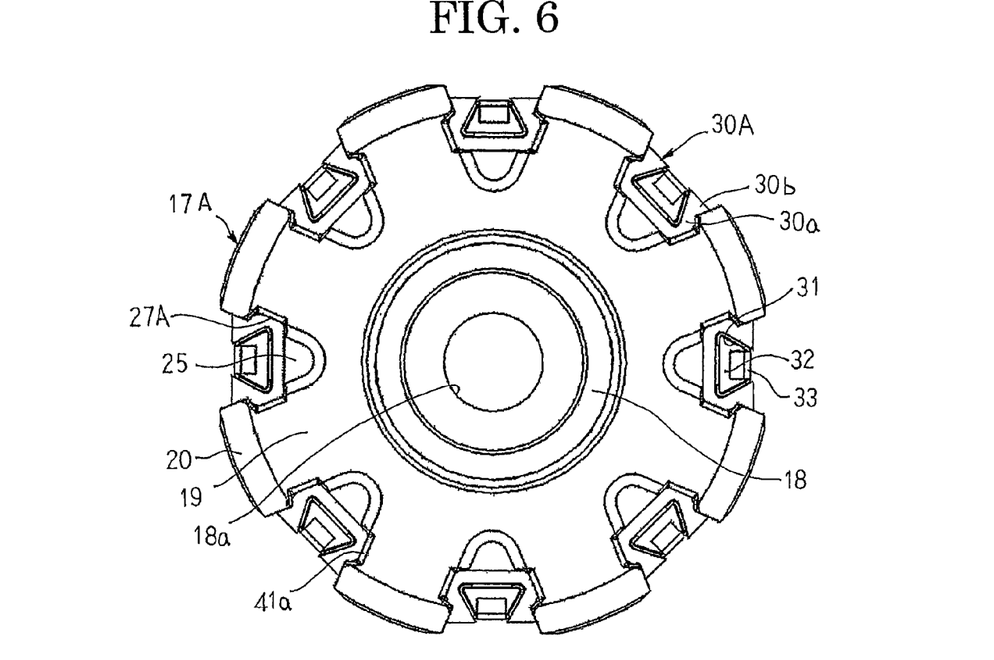
FIG. 6 is an end elevation that shows a rotor that can be used in an automotive alternator according to Embodiment 2 of the present invention.
Figure 7:
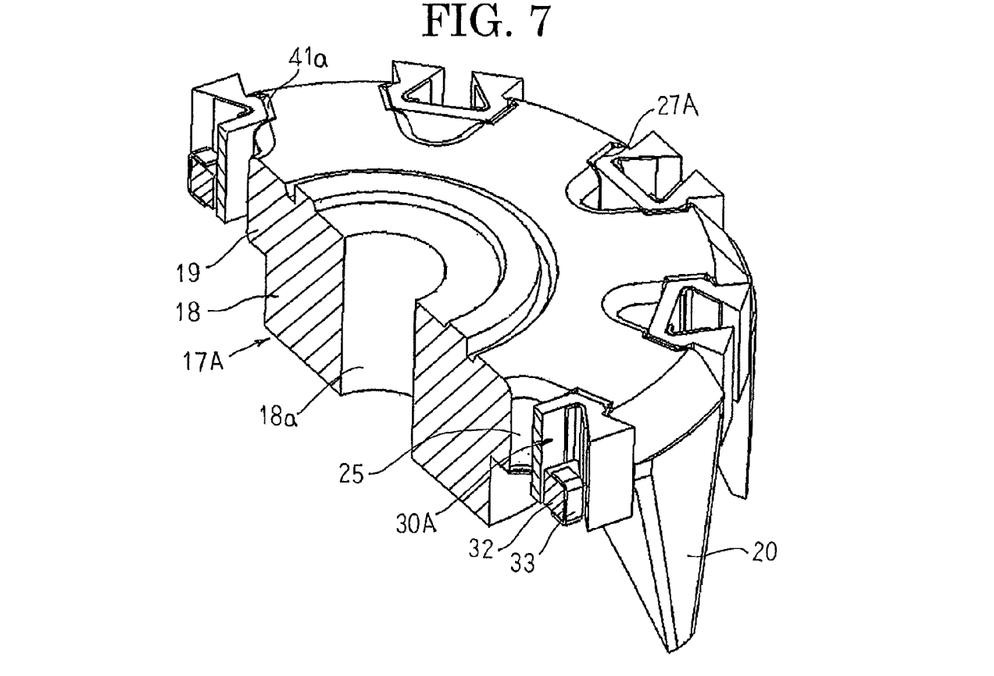
FIG. 7 is a cross section that shows a state in which permanent magnets are mounted to a first pole core body that constitutes the rotor that can be used in the automotive alternator according to Embodiment 2 of the present invention.
Figure 8:
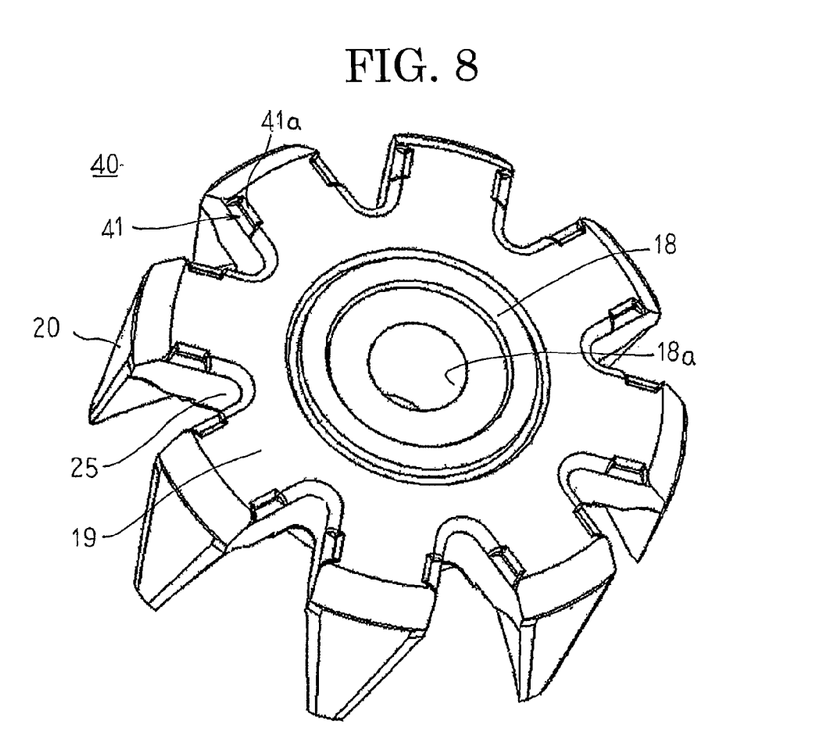
FIG. 8 is a perspective that shows a state before holding grooves are machined in the first pole core body that constitutes the rotor that can be used in the automotive alternator according to Embodiment 2 of the present invention.
Figure 9:
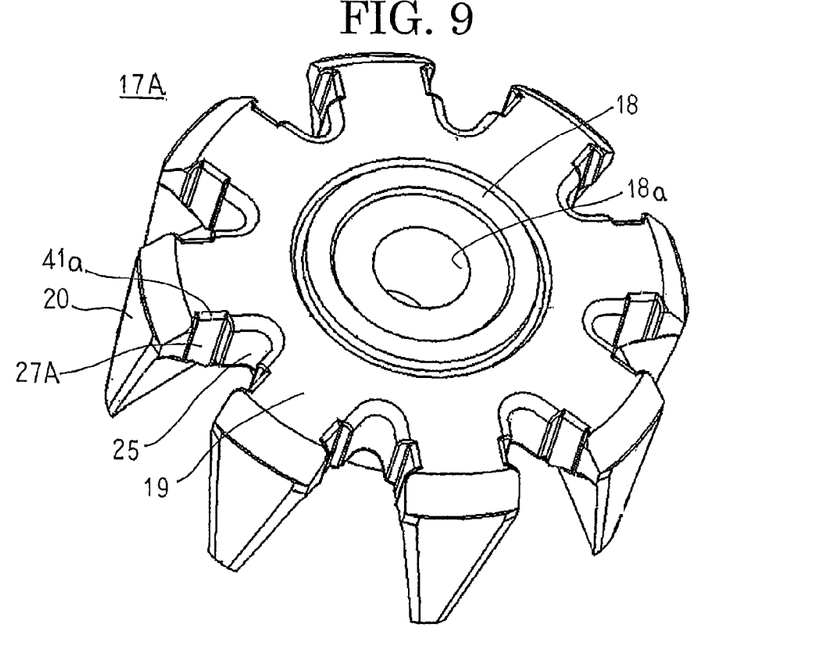
FIG. 9 is a perspective that shows a state after holding grooves are machined in the first pole core body that constitutes the rotor that can be used in the automotive alternator according to Embodiment 2 of the present invention.

FIG. 6 is an end elevation that shows a rotor that can be used in an automotive alternator according to Embodiment 2 of the present invention, FIG. 7 is a cross section that shows a state in which permanent magnets are mounted to a first pole core body that constitutes the rotor that can be used in the automotive alternator according to Embodiment 2 of the present invention, FIG. 8 is a perspective that shows a state before holding grooves are machined in the first pole core body that constitutes the rotor that can be used in the automotive alternator according to Embodiment 2 of the present invention, and FIG. 9 is a perspective that shows a state after holding grooves are machined in the first pole core body that constitutes the rotor that can be used in the automotive alternator according to Embodiment 2 of the present invention.

In FIGS. 6, 7, and 9, two side portions 30a of first magnet holders 30A are disposed so as to extend beyond upper surfaces of first permanent magnets 32, and flange portions 30b are disposed so as to extend from upper portions of the two side portions 30a on two circumferential sides. First holding grooves 27A are recessed so as to pass through from a first end portion to a second end portion of a first yoke portion 19 near root ends of respective first claw-shaped magnetic pole portions 20 of a first pole core body 17A so as to have openings at respective facing portions near upper portions of inner walls surfaces of respective first trough portions 25 and so as to have groove directions in the axial direction, and so as to have groove shapes that have angular U-shaped cross sections into which the first magnet holders 30A can be fitted. In addition, formed surfaces 41a are formed so as to have splayed shapes at two groove direction ends of the first holding grooves 27A. First permanent magnets 32 to which first magnet scattering preventing covers 33 have been mounted are fitted into first interfitting grooves 31, and are held by the first magnet holders 30A, an adhesive being applied if required.

The first magnet holders 30A into which the first permanent magnets 32 have been fitted are press fitted into facing first holding grooves 27A from axially outside, and are disposed so as to span over the first trough portions 25, adhesive being applied if required. At this point, the flange portions 30b of the first magnet holders 30A contact side surfaces near the root ends of the first claw-shaped magnetic pole portions 20.

Moreover, a second pole core body is configured in a similar manner to the first pole core body 17A including a magnet holding construction, and explanation thereof will be omitted here. The rest of the configuration is configured in a similar manner to Embodiment 1 above.

In Embodiment 2, because the first magnet holders 30A are also disposed so as to span over the first trough portions 25, and the first permanent magnets 32 are held in the first magnet holders 30A that are disposed so as to span over the first trough portions 25, similar effects to those in Embodiment 1 above can also be achieved.

According to Embodiment 2, because flange portions 30b that are disposed so as to extend from upper portions of two side portions 30a of the first magnet holders 30A on two circumferential sides contact facing side surfaces near the root ends of adjacent first claw-shaped magnetic pole portions 20, forces that could expand gaps near upper portions of the two side portions 30a are borne by the adjacent first claw-shaped magnetic pole portions 20, preventing the gaps near the upper portions of the two side portions 30a from expanding. Thus, even if centrifugal forces act so as to move the first permanent magnets 32 radially outward, expansion of the gaps near the upper portions of the two side portions 30a is prevented, reliably preventing scattering of the first permanent magnets 32.

If forces that could expand gaps near upper portions of the two side portions 30a act to deform and displace the upper portions of the two side portions 30a so as to expand the gaps, bending stresses act on intersecting portions between the bottom surfaces and the side surfaces of the first receiving grooves 31 of the first magnet holders 30A. If these bending stresses exceed an allowable stress of the first magnet holders 30A, there is a risk that the first magnet holders 30A may be damaged, and become unable to hold the magnets. In Embodiment 2, because the flange portions 30b contact the side surfaces near the root ends of the first claw-shaped magnetic pole portions 20, displacement near the upper portions of the two side portions 30a that expands the gaps is borne by the adjacent first claw-shaped magnetic pole portions 20, reducing bending stresses, and significantly improving magnet holding strength by the first magnet holders 30A.

Now, in Embodiment 2 above, the flange portions 30b of the first magnet holders 30A contact the side surfaces near the root ends of the first claw-shaped magnetic pole portions 20, but it is not absolutely necessary for the flange portions 30b to contact the side surfaces near the root ends of the first claw-shaped magnetic pole portions 20, and the flange portions 30b need only be able to contact the side surfaces near root ends of the first claw-shaped magnetic pole portions 20 and limit further deformation of the flange portions 30b before bending stresses that result from deformation of the flange portions 30b exceed the allowable stress of the first magnet holders 30A.

Next, a manufacturing method for a first pole core body according to Embodiment 2 will be explained.

First, although not shown, a core body 40 that has a shape in which portions that correspond to claw-shaped magnetic pole portions extend radially outward from a yoke portion is formed using a cold forging method, and then claw-shaped magnetic pole portions are formed by bending approximately at right angles the portions that correspond to claw-shaped magnetic pole portions that extend radially outward from the yoke portion. As shown in FIG. 8, recess portions 41 are recessed to a predetermined depth on portions of upper side edge portions of respective first trough portions 25 on two end surfaces of a first yoke portion 19 of the core body 40 that has been prepared in this manner. These recess portions 41 are simultaneously formed during forming of the core body 40.

Next, the recess portions 41 that face each other in an axial direction of the core body 40 are passed through by end milling, for example, to obtain the first pole core body 17A that is shown in FIG. 9. In this first pole core body 17A, first holding grooves 27A are formed near the root ends of the respective first claw-shaped magnetic pole portions 20 so as to pass through from a first end portion to a second end portion of the first yoke portion 19 so as to have groove directions oriented in an axial direction at respective facing portions near upper portions of inner wall surfaces of the respective first trough portions 25.

Here, the first holding grooves 27A are formed so as to have groove shapes that have angular U-shaped cross sections that conform to shapes of interfitting portions of the first magnet holders 30A. Specifically, the first holding grooves 27A have groove shapes that have angular U-shaped cross sections that are constituted by pairs of splayed, flat side surfaces into which lower surfaces of the first magnet holders 30A and linking portions of the flange portions 30b with the side portion 30a engage, and flat bottom surfaces into which the side surfaces of the first magnet holders 30A engage.

In a first pole core body 17A that has been prepared in this manner, inner circumferential surfaces of the recess portions 41 are formed so as to have a splayed shape at two groove direction ends of the first holding grooves 27A. Specifically, the formed surfaces 41a are formed so as to have a splayed shape at the two groove direction ends of the first holding grooves 27A instead of cut surfaces.

In Embodiment 2, because the recess portions 41 are simultaneously formed during forming of the core body 40, groove machining length in holding groove machining is shorter by a depth of the recess portions 41, shortening holding groove machining time, and enabling machining costs to be reduced.

Because the first holding grooves 27A have groove shapes that have angular U-shaped cross sections that are constituted by pairs of splayed, flat side surfaces into which lower surfaces of the first magnet holders 30A and linking portions of the flange portions 30b with the side portion 30a engage, and flat bottom surfaces into which the side surfaces of the first magnet holders 30A engage, first holding grooves 27A can be prepared to a high milling precision on a core body 40 that has been cold forged, by running an end mill so as to trace the groove shape using a side surface blade of the end mill.

Moreover, the recess portions 41 are explained as being simultaneously formed during forming of the core body 40, but first holding grooves may also be formed by machining such as end milling, etc., on a core body 40 that has been formed without recessing recess portions.

Embodiment 3

Figure 10:
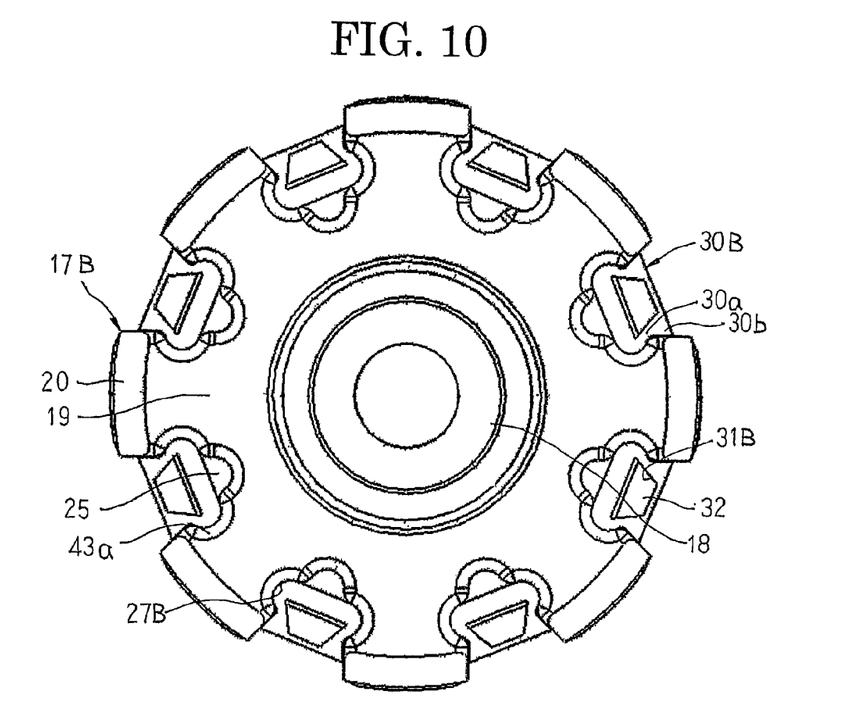
FIG. 10 is an end elevation that shows a rotor that can be used in an automotive alternator according to Embodiment 3 of the present invention.
Figure 11:
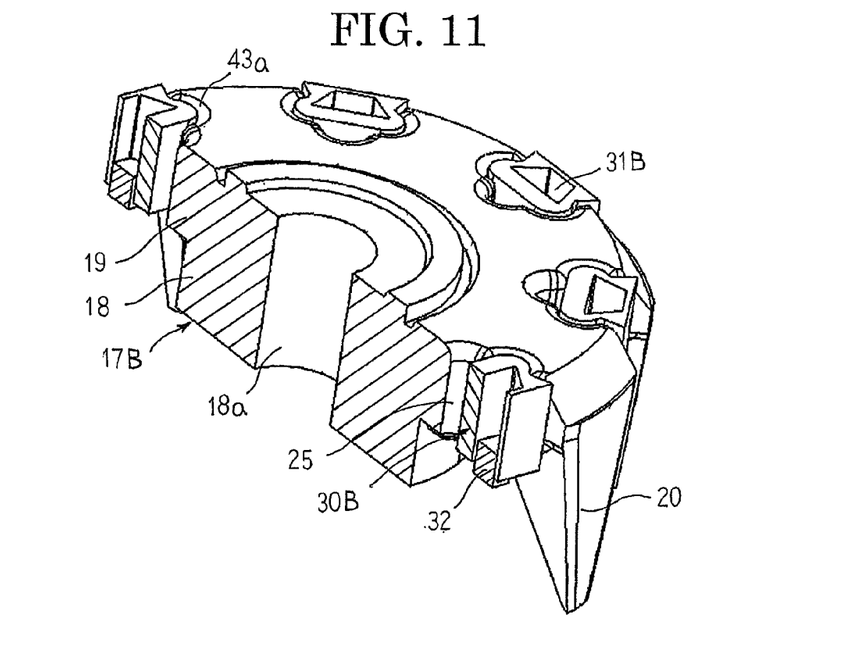
FIG. 11 is a cross section that shows a state in which permanent magnets are mounted to a first pole core body that constitutes the rotor that can be used in the automotive alternator according to Embodiment 3 of the present invention.
Figure 12:
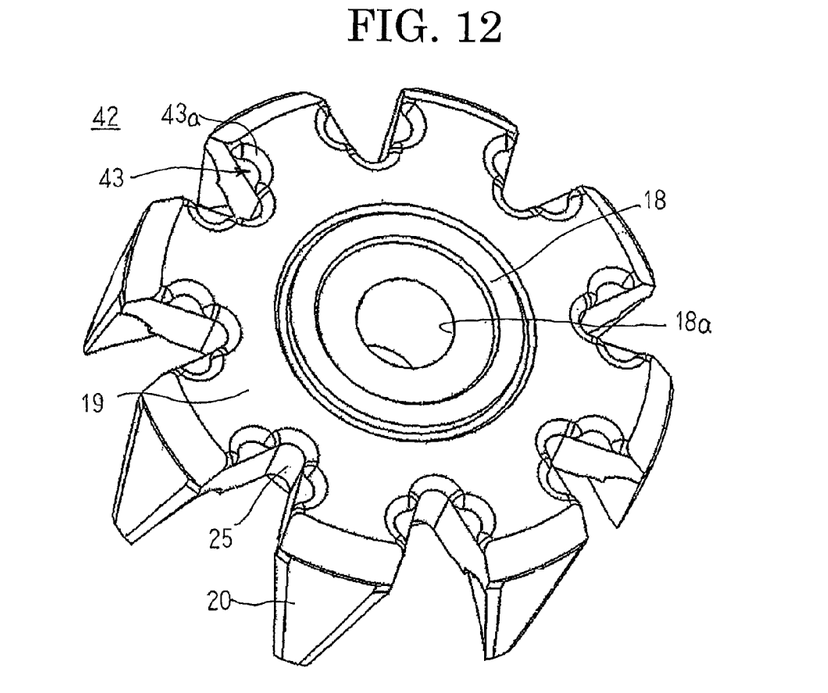
FIG. 12 is a perspective that shows a state before holding grooves are machined in the first pole core body that constitutes the rotor that can be used in the automotive alternator according to Embodiment 3 of the present invention.
Figure 13:
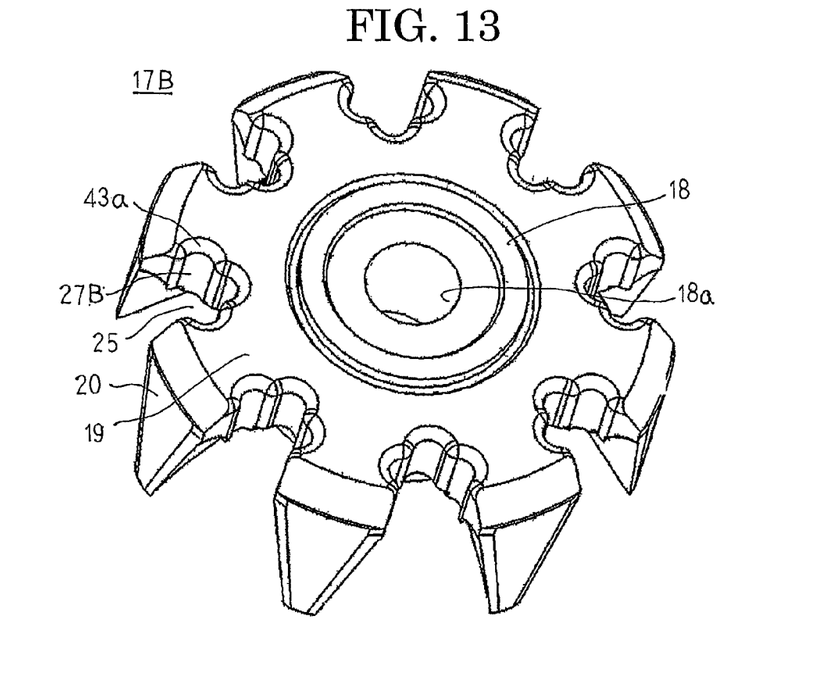
FIG. 13 is a perspective that shows a state after holding grooves are machined in the first pole core body that constitutes the rotor that can be used in the automotive alternator according to Embodiment 3 of the present invention.

FIG. 10 is an end elevation that shows a rotor that can be used in an automotive alternator according to Embodiment 3 of the present invention, FIG. 11 is a cross section that shows a state in which permanent magnets are mounted to a first pole core body that constitutes the rotor that can be used in the automotive alternator according to Embodiment 3 of the present invention, FIG. 12 is a perspective that shows a state before holding grooves are machined in the first pole core body that constitutes the rotor that can be used in the automotive alternator according to Embodiment 3 of the present invention, and FIG. 13 is a perspective that shows a state after holding grooves are machined in the first pole core body that constitutes the rotor that can be used in the automotive alternator according to Embodiment 3 of the present invention.

In FIGS. 10, 11, and 13, first magnet holders 30B are prepared into columnar bodies in which upper and lower surfaces are mutually parallel flat surfaces, lower portions of two side surfaces are circular arc-shaped surfaces, and two end surfaces are flat surfaces that are perpendicular to a longitudinal direction. First interfitting grooves 31 that have groove directions in the longitudinal direction of the first magnet holders 30B, and that have trapezoidal cross sections into which the first permanent magnets 32 can be fitted, are disposed through so as to have openings at two end surfaces of the first magnet holders 30B. Flange portions 30b are disposed so as to extend from upper portions of two side portions 30a of the first magnet holders 30B on two circumferential sides.

First holding grooves 27B are recessed so as to pass through from a first end portion to a second end portion of a first yoke portion 19 near root ends of respective first claw-shaped magnetic pole portions 20 of a first pole core body 17B so as to have openings at respective facing portions near upper portions of inner walls surfaces of respective first trough portions 25 and so as to have groove directions in the axial direction, and so as to have groove shapes that have circular arc-shaped cross sections into which the first magnet holders 30B can be fitted. In addition, formed surfaces 43a are formed so as to have splayed shapes at two groove direction ends of the first holding grooves 27B. First permanent magnets 32 are fitted into first interfitting grooves 31B, and are held by the first magnet holders 30B, an adhesive being applied if required.

The first magnet holders 30B into which the first permanent magnets 32 have been fitted are press fitted into facing first holding grooves 27B from axially outside, and are disposed so as to span over the first trough portions 25, adhesive being applied if required. At this point, the flange portions 30b of the first magnet holders 30B contact side surfaces near the root ends of the first claw-shaped magnetic pole portions 20.

Moreover, a second pole core body is configured in a similar manner to the first pole core body 17B including a magnet holding construction, and explanation thereof will be omitted here. The rest of the configuration is configured in a similar manner to Embodiment 1 above.

In Embodiment 3, because the first magnet holders 30B are also disposed so as to span over the first trough portions 25, and the first permanent magnets 32 are held in the first magnet holders 30B that are disposed so as to span over the first trough portions 25, similar effects to those in Embodiment 1 above can also be achieved.

According to Embodiment 2, because flange portions 30b that are disposed so as to extend from upper portions of two side portions 30a of the first magnet holders 30B on two circumferential sides contact facing side surfaces near the root ends of adjacent first claw-shaped magnetic pole portions 20, forces that could expand gaps near upper portions of the two side portions 30a are borne by the adjacent first claw-shaped magnetic pole portions 20, preventing the gaps near the upper portions of the two side portions 30a from expanding. Thus, even if centrifugal forces act so as to move the first permanent magnets 32 radially outward, expansion of the gaps near the upper portions of the two side portions 30a is prevented, reliably preventing scattering of the first permanent magnets 32.

Because the first interfitting grooves 31B are disposed through the first magnet holders 30B, outer circumferences of the second permanent magnets 32 are covered by the first magnet holders 30B, enabling magnet scattering preventing covers to be omitted.

Next, a manufacturing method for a first pole core body according to Embodiment 3 will be explained.

First, although not shown, a core body 42 that has a shape in which portions that correspond to claw-shaped magnetic pole portions extend radially outward from a yoke portion is formed using a cold forging method, and then claw-shaped magnetic pole portions are formed by bending approximately at right angles the portions that correspond to claw-shaped magnetic pole portions that extend radially outward from the yoke portion. As shown in FIG. 12, recess portions 43 are recessed to a predetermined depth on portions of upper side edge portions of respective first trough portions 25 on two end surfaces of a first yoke portion 19 of the core body 42 that has been prepared in this manner. These recess portions 43 are simultaneously formed during forming of the core body 42.

Next, the recess portions 43 that face each other in an axial direction of the core body 42 are passed through by end milling, for example, to obtain the first pole core body 17B that is shown in FIG. 13. In this first pole core body 17B, first holding grooves 27B are formed near the root ends of the respective first claw-shaped magnetic pole portions 20 so as to pass through from a first end portion to a second end portion of the first yoke portion 19 so as to have groove directions oriented in an axial direction at respective facing portions near upper portions of inner wall surfaces of the respective first trough portions 25.

In a first pole core body 17B that has been prepared in this manner, inner circumferential surfaces of the recess portions 43 are formed so as to have a splayed shape at two groove direction ends of the first holding grooves 27B. Specifically, the formed surfaces 43a are formed so as to have a splayed shape at the two groove direction ends of the first holding grooves 27B instead of cut surfaces.

In Embodiment 3, because the recess portions 43 are simultaneously formed during forming of the core body 42, groove machining length in holding groove machining is shorter by a depth of the recess portions 43, shortening holding groove machining time, and enabling machining costs to be reduced.

Because the first holding grooves 27B have groove shapes that have circular arc-shaped cross sections, the first holding grooves 27B can be prepared in the core body 42 that has been cold forged by a single drilling with an end mill, enabling simplification of a groove machining step.

Embodiment 4

Figure 14:
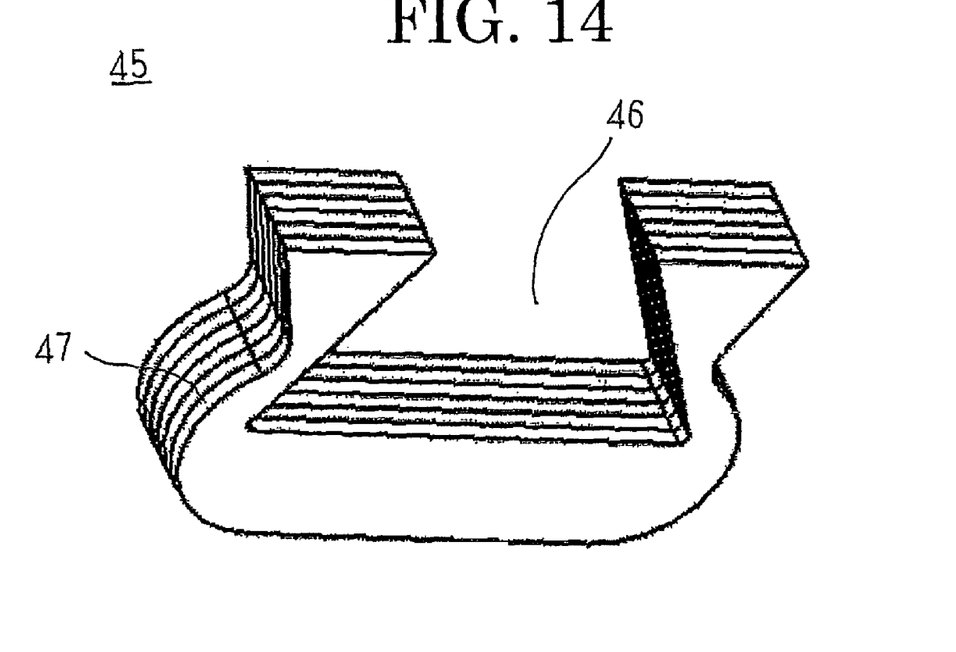
FIG. 14 is a perspective that shows a magnet holder in a automotive alternator according to Embodiment 4 of the present invention.

In Embodiment 4, as shown in FIG. 14, a magnet holder 45 is prepared by laminating and integrating steel plates 47 that are formed such that a groove aperture that constitutes an interfitting groove 46 has an opening on an upper portion. This magnet holder 45 has an external shape that is similar to that of the first magnet holders 30A that are prepared by a cold forging method or drawing, etc., using a material such as iron, a ferromagnetic alloy, etc.

Consequently, a rotor may also be configured using magnet holders 45 instead of the first magnet holders 30A. Moreover, in that case, magnet scattering preventing covers can be mounted if required.

Because the magnet holders 45 can be prepared by laminating steel plates 47 that have been prepared by pressing, corner curves can be made smaller than when magnet holders are prepared by cold forging or drawing, increasing degrees of freedom in machined shapes, and also enabling shortening of machining time to be achieved.

Embodiment 5

Figure 15:
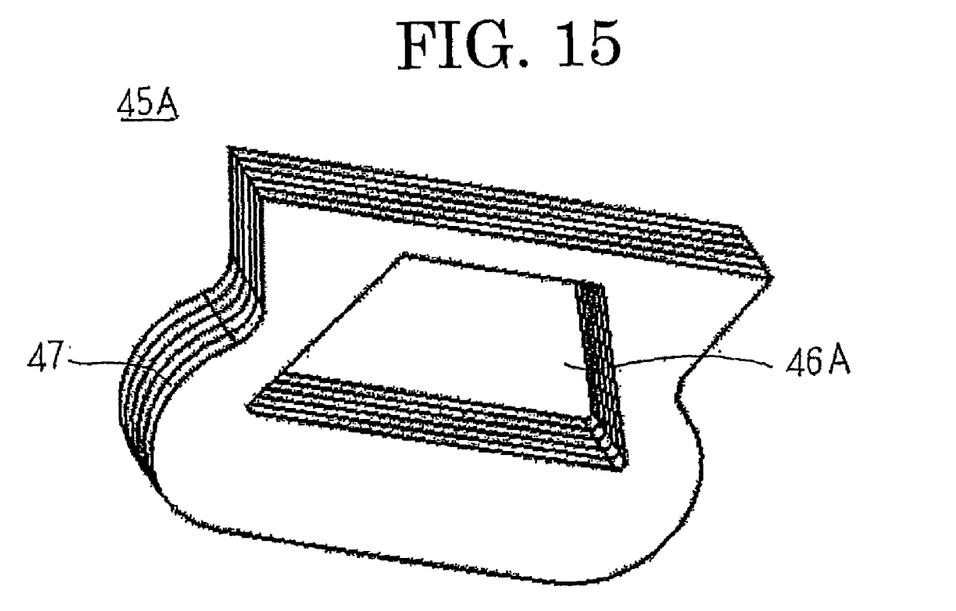
FIG. 15 is a perspective that shows a magnet holder in a automotive alternator according to Embodiment 5 of the present invention.

In Embodiment 5, as shown in FIG. 15, a magnet holder 45A is prepared by laminating and integrating steel plates 47 such as magnetic steel plates or stainless steel plates, etc., through which a groove aperture that constitutes an interfitting groove 46 has been disposed. This magnet holder 45A is configured in a similar manner to the magnet holder 45 of Embodiment 4 above except that an upper portion of the interfitting groove 46 is closed.

Consequently, a rotor may also be configured using magnet holders 45A instead of the magnet holders 45. In Embodiment 5, in addition to the effects of Embodiment 4 above, mounting of magnet scattering preventing covers can be omitted because the magnet holders 45A are configured so as to have shapes that cover radially outer sides of the permanent magnets.

Moreover, in each of the above embodiments, explanations are given for automotive alternators, but the present invention is not limited to automotive alternators, and similar effects are also exhibited if the present invention is applied to dynamoelectric machines such as automotive electric motors, automotive generator-motors, etc.

In each of the above embodiments, magnet holders are explained as being fitted into and held by holding grooves that have been recessed into yoke portions, but magnet holders may also be held directly on the yoke portions by adhesion or welding, etc., without forming holding grooves.

Moreover, in each of the above embodiments, magnet holders are disposed in all of the trough portions, but magnet holders may also be disposed in selected trough portions. Moreover, in that case, it is preferable to dispose the magnet holders in a well-balanced manner circumferentially. For example, magnet holders may also be disposed in all of the trough portions of the second pole core body while not disposing any magnet holders in the first pole core body, or magnet holders may also be disposed in every second trough portion in a circumferential direction in both the first and second pole core bodies. Although adopting this kind of configuration reduces output slightly compared to when the magnet holders are disposed in all of the trough portions, the number of parts can be reduced, enabling output to be increased using an inexpensive configuration.

What is claimed is:

1. A dynamoelectric machine comprising:
   a rotor having:
      a pole core having:
         a boss portion;
         a pair of yoke portions that are disposed so as to extend radially outward from two axial end edge portions of said boss portion; and
         a plurality of claw-shaped magnetic pole portions that are disposed so as to extend in an axial direction alternately from each of said pair of yoke portions, and that are arranged circumferentially so as to intermesh with each other,
      trough portions being formed on respective portions of said yoke portions between circumferentially adjacent claw-shaped magnetic pole portions, and said pole core being fixed to a rotating shaft that is inserted through a central axial position of said boss portion; and
      a field coil that is housed inside a space that is surrounded by said boss portion, said pair of yoke portions, and said plurality of claw-shaped magnetic pole portions; and
   a stator that is disposed so as to surround an outer circumference of said rotor so as to have a predetermined air gap interposed, wherein:
   a magnet holder is disposed so as to span over said trough portions by being connected to each of consecutive yoke portions at locations above a curved bottom of said trough portions, an inner part of the magnet holder having a trapezoidal cross section perpendicular to a longitudinal direction of the magnet holder such that two inner side surfaces of the magnet holder are inclined toward each other, and a permanent magnet is held in said magnet holder so as to face an inner circumferential surface near a tip end of said claw-shaped magnetic pole portions so as to have a predetermined clearance.

2. The dynamoelectric machine according to claim 1, wherein holding grooves are recessed near root ends of said claw-shaped magnetic pole portions of said pole core so as to have openings on respective facing portions near an upper portion of an inner wall surface of said trough portions, and so as to have groove directions oriented in an axial direction and have an opening on at least one end surface of said yoke portions, and said magnet holder is held by said pole core by being fitted into a respective holding groove.

3. The dynamoelectric machine according to claim 2, wherein a wedge-shaped engaging groove in which a circumferential width becomes gradually narrower radially outward is disposed so as to have a groove direction oriented in an axial direction and pass through from a first end portion to a second end portion of said magnet holder, and said permanent magnet is held by said magnet holder by being fitted into said engaging groove.

4. The dynamoelectric machine according to claim 2, wherein surfaces at an opening portion of said holding grooves in said groove direction of said holding grooves are formed into a splayed shape.

5. The dynamoelectric machine according to claim 4, wherein a wedge-shaped engaging groove in which a circumferential width becomes gradually narrower radially outward is disposed so as to have a groove direction oriented in an axial direction and pass through from a first end portion to a second end portion of said magnet holder, and said permanent magnet is held by said magnet holder by being fitted into said engaging groove.

6. The dynamoelectric machine according to claim 1, wherein said magnet holder is prepared using a magnetic material.

7. The dynamoelectric machine according to claim 1, wherein said magnet holder is prepared using a laminated body of steel plates.

8. The dynamoelectric machine according to claim 1, further comprising a magnet scattering preventing cover provided between the permanent magnet and the magnet holder.

9. The dynamoelectric machine according to claim 8, wherein the magnet scattering preventing cover has a trapezoidal cross section perpendicular to a longitudinal direction of the magnet scattering preventing cover.

* * * * *